United States Patent [19]

Maughan

[11] Patent Number: 5,564,853
[45] Date of Patent: Oct. 15, 1996

[54] BALL AND SOCKET JOINT ASSEMBLY

[75] Inventor: Garth B. Maughan, Delta, Ohio

[73] Assignee: Dana Corporation, Toledo, Ohio

[21] Appl. No.: 363,569

[22] Filed: Dec. 22, 1994

Related U.S. Application Data

[63] Continuation of Ser. No. 96,134, Jul. 22, 1993.

[51] Int. Cl.$^6$ ................................................ F16C 11/06
[52] U.S. Cl. ........................ 403/137; 403/124; 403/135; 403/140; 29/441.1; 29/898.047; 384/208; 384/209
[58] Field of Search ..................... 403/122, 124, 403/135, 137, 140; 29/441.1, 525, 898.044, 898.047; 384/206, 208, 209, 210

[56] References Cited

U.S. PATENT DOCUMENTS

| | | | |
|---|---|---|---|
| 4,187,033 | 2/1980 | Zukowski | 403/137 X |
| 4,318,627 | 3/1982 | Morin | 403/133 |
| 4,353,660 | 10/1982 | Parks | 403/132 |
| 4,684,279 | 8/1987 | Weber | 403/136 |
| 4,690,581 | 9/1987 | Umemoto et al. | 403/140 |
| 4,844,627 | 7/1989 | Speakman | 384/208 |
| 4,875,794 | 10/1989 | Kern, Jr. | 403/137 |
| 4,880,329 | 11/1989 | Sakai | 403/140 |
| 4,904,106 | 2/1990 | Love | 403/140 |
| 4,971,473 | 11/1990 | Schafer et al. | 403/140 |
| 4,995,755 | 2/1991 | Hyodo et al. | 403/137 |
| 5,116,159 | 5/1992 | Kern, Jr. et al. | 403/137 X |
| 5,247,873 | 9/1993 | Owens et al. | 384/206 |
| 5,380,114 | 1/1995 | Urbach | 403/135 |

FOREIGN PATENT DOCUMENTS

| | | |
|---|---|---|
| 0132574 | 2/1985 | European Pat. Off. . |
| 0342351 | 11/1989 | European Pat. Off. ............ 403/137 X |
| 2343157 | 9/1977 | France . |
| 2387375 | 11/1978 | France . |
| 300234 | 9/1954 | Switzerland . |

OTHER PUBLICATIONS

European Search Report for EP 94305391 dated Nov. 3, 1994.

English translation of EP 0342351.

*Primary Examiner*—Edward K. Look
*Assistant Examiner*—Michael S. Lee
*Attorney, Agent, or Firm*—Rader, Fishman & Grauer PLLC

[57] ABSTRACT

A bearing set for a ball socket joint comprises an outer bearing and an inner bearing with a head of a ball stud engaging a spherical inner seat face of each of the bearings. A compression pre-load is applied when the inner bearing is inserted into a cavity of the outer bearing, a cylindrical outer wedge surface of the inner bearing having a greater diameter than a corresponding diameter of an inner skirt defining the cavity of the outer bearing. The bearing set is subjected to additional compression pre-load when the bearing set and ball stud are inserted into a socket and the socket is closed. The two-piece bearing set promotes easy Joint assembly, results in a joint that is extremely tight with no axial or radial play, but allows necessary ball stud rotation and oscillation, and compensates for wear by a self-adjusting feature whereby some of the compression pre-load is released as wear takes place.

26 Claims, 3 Drawing Sheets

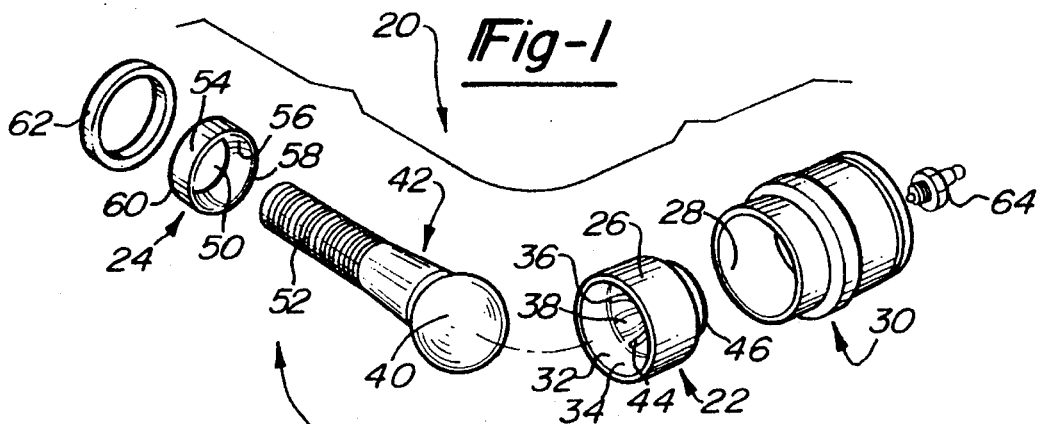
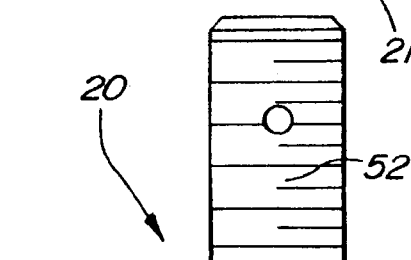
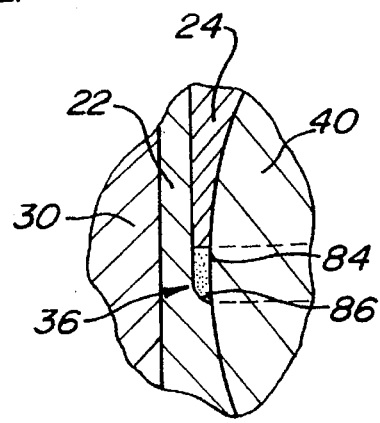
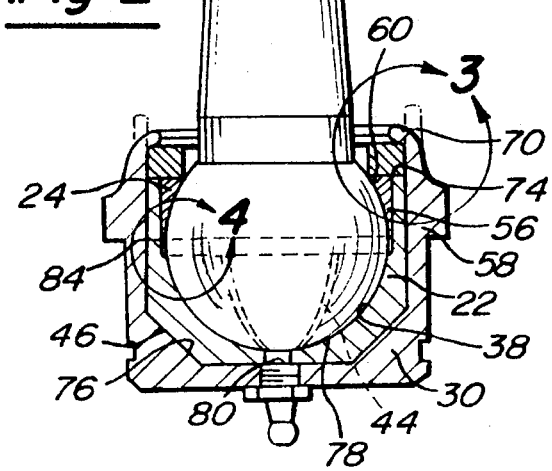
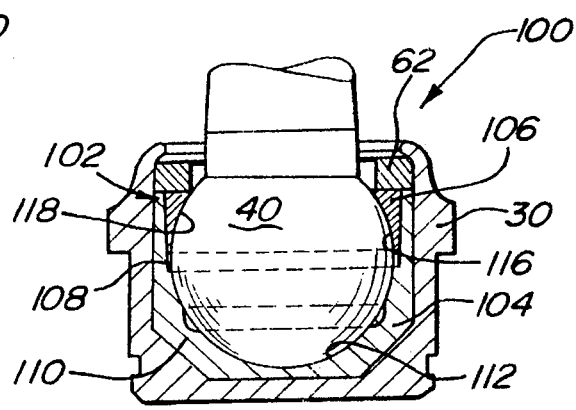

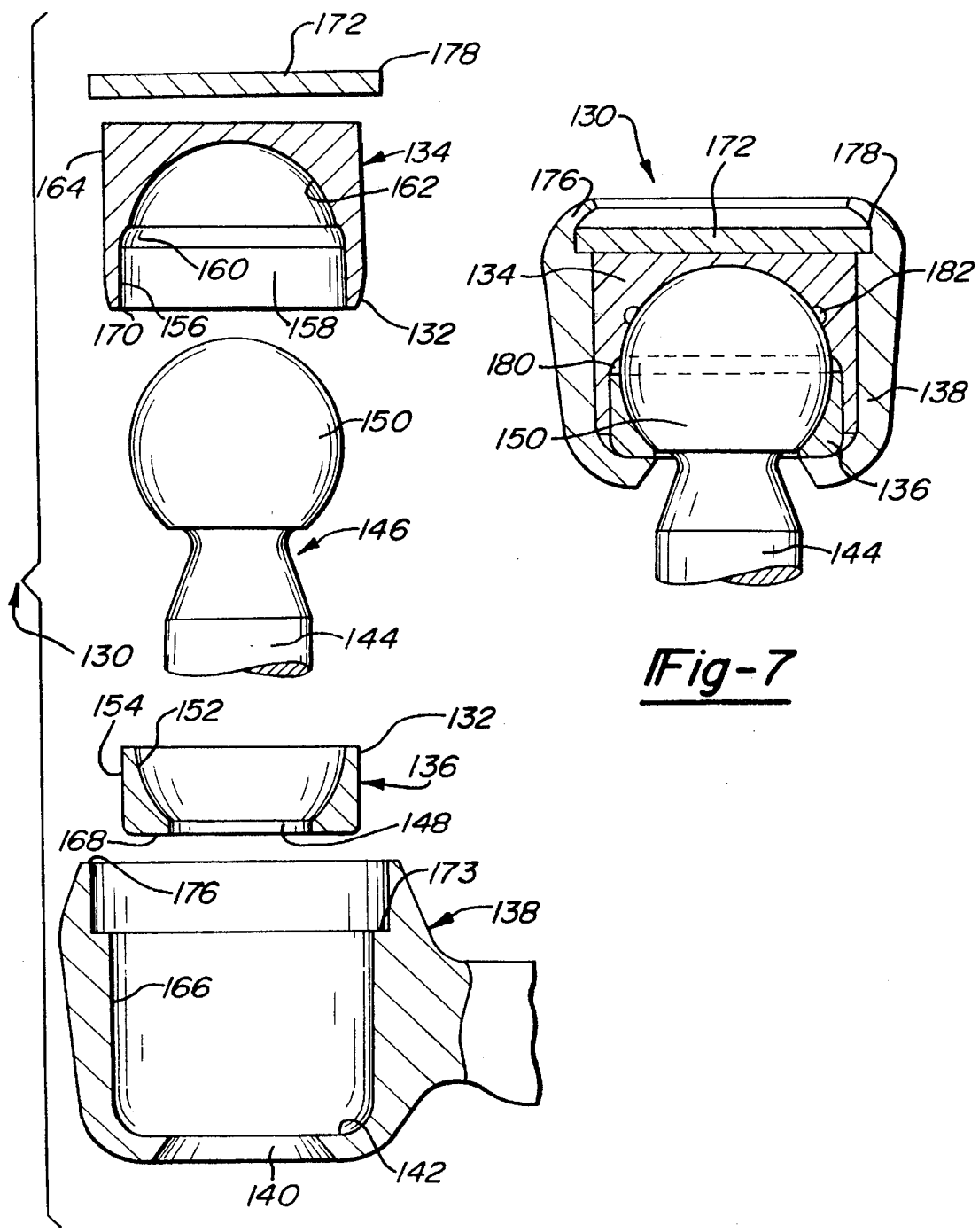

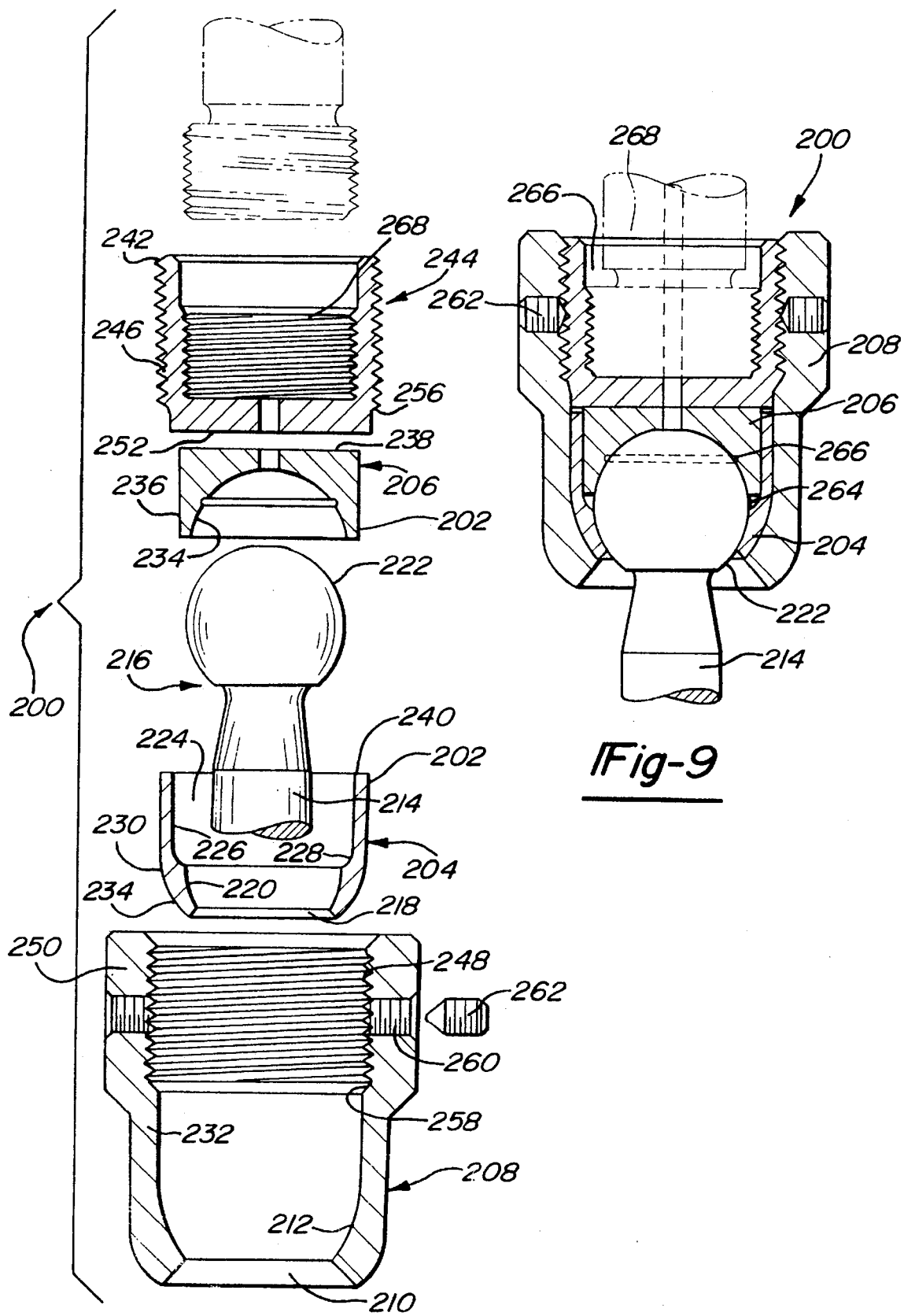

BALL AND SOCKET JOINT ASSEMBLY

This is a continuation of copending application(s) Ser. No. 08/096,134 filed on Jul. 22,1993.

BACKGROUND OF THE INVENTION

The present invention relates to a ball and socket joint assembly for a wide range of applications, comprising a two-piece bearing set that engages a head of a ball stud when retained within a socket under a compression pre-load.

Ball and socket joints are used in a variety of applications, including rack and pinion inner tie rod socket assemblies, steering knuckles, drag links, and connecting rod assemblies. Such joints typically include a cylindrical socket member adapted to receive a bearing together with a head of a ball stud. The bearing reduces the amount of friction between the socket and the head of the ball stud while frequently adapting for looseness between the stud and socket members resulting from wear.

Such joints have been subject to many disadvantages, however. Assembly is difficult. Typically, the stud head must be forced into the bearing, and in turn the bearing forced into the socket. Cracked bearings result during assembly, particularly when very rigid, stiff, inelastic materials are used. To reduce such cracks, slots are often required within the bearing itself. Load distribution on such slotted bearings during operation typically results in undesirable wear between the various components. Further, the bearings of such joints can adapt for only limited wear, resulting in joint failure as stud head rotating torque decreases and axial end play increases.

SUMMARY OF THE INVENTION

An improved ball and socket joint includes a two-piece bearing set that promotes easy joint assembly, results in a joint that is extremely tight with no axial or radial play, allows necessary ball stud rotation and oscillation, and compensates for wear using a self-adjusting feature related to the release of a compression pre-load within the bearing set.

The two-piece bearing set comprises an annular outer bearing with a spherical inner seat face and a generally cylindrical inner skirt that defines a cavity extending axially about an axis of symmetry. The spherical inner seat face is adapted to engage a head of a ball stud. A compressive pre-load is applied when an annular inner bearing is inserted into the cavity of the outer bearing. The inner bearing has a generally cylindrical outer wedge surface, a diameter of the wedge surface being greater than a corresponding diameter of the inner skirt. Preferably, the inner skirt of the outer bearing and the outer wedge surface of the inner bearing are cylindrical. If non-cylindrical surfaces are used, the inner bearing may become wedged within the outer bearing before the inner spherical seat face of the inner bearing engages the head.

The bearing set is retained within an annular socket. Various embodiments of sockets and bearing sets allow the present invention to be used in many applications. Typically, however, the outer bearing includes an outer surface adapted to conform to an inner surface of the socket. In preferred embodiments, the outer surface of the outer bearing includes either a frusto-conical nose portion or a hemispherical nose portion to help in the distribution of applied loads, and to further promote a very tight joint during assembly.

The inner bearing includes a compression rim that extends axially outwardly from an axially inner skirt edge of the outer bearing, such that an axial force may be applied to the compression rim to provide additional compression pre-loading to the bearing set. This distance is limited, however, so that the outer bearing may stabilize any pre-load upon the inner bearing. Various embodiments are disclosed for closing and sealing the socket that also apply the desired axial force to the bearing set. In one preferred embodiment, a sealing means such as a retaining ring or sealing washer is placed in facial contact with the bearing set and then an annular lip of the socket is crimped over the sealing means. In another preferred embodiment, a plug, acting as both a closure means and as a sealing means, is selectively threaded into the socket to engage the bearing set.

The compression pre-loading of the bearing set provides a unique self-adjusting feature to the present invention. As wear takes place, some compression pre-loading of the bearings is released, while still maintaining zero axial or radial play of the assembled components.

Both re-greaseable and "lubed for life" ball and socket joints are disclosed. Both types of joints include an annular pocket formed by a lip of the outer bearing in a transition zone between the inner skirt and the spherical inner seat face. The pocket functions as a well for joint lubricant. Equally important, however, the pocket provides relief through slight material "flow" for over compression of bearing material during assembly.

The various embodiments of the present invention are easily assembled. The head of a ball stud is inserted into an outer bearing to engage a spherical inner seat face of the outer bearing. An inner bearing is forced into a cavity defined by a generally cylindrical inner skirt of the outer bearing with the head engaging a spherical inner seat face of the inner bearing. Then the head of the ball stud, encapsulated by the assembled bearing set, is disposed within a socket and the socket closed. It is not until the socket is closed that an axial force is applied to the bearing set.

BRIEF DESCRIPTION OF THE DRAWINGS

The features and inventive aspects of the present invention will become more apparent upon reading the following detailed description, claims, and drawings, of which the following is a brief description:

FIG. 1 is an exploded perspective view of a ball and socket assembly according to a first embodiment of the present invention.

FIG. 2 is a longitudinal view including a partial cross-section of the first embodiment of the present invention.

FIG. 3 is an enlarged view of a portion of the first embodiment, as indicated by the encircled area A—A of FIG. 2.

FIG. 4 is an enlarged cross-sectional view of a portion of the first embodiment, as indicated by the encircled area B—B of FIG. 2.

FIG. 5 is a longitudinal view including a partial cross-section of a second embodiment of the present invention.

FIG. 6 is an exploded longitudinal view including a partial cross-section of a third embodiment of the present invention.

FIG. 7 is a longitudinal view including a partial cross-section of the third embodiment of the present invention.

FIG. 8 is an exploded longitudinal view including a partial cross-section of a fourth embodiment of the present invention.

FIG. 9 is a longitudinal view including a partial cross-section of the fourth embodiment of the present invention.

DESCRIPTION OF PREFERRED EMBODIMENTS

A re-greaseable, top closure ball and socket joint 20, illustrated in FIG. 1, includes a two-piece bearing set 21 comprising an annular outer bearing 22 and an annular inner bearing 24.

Outer bearing 22 includes an outer surface 26 adapted to conform to an inner surface 28 of an annular socket 30. A cavity 32 of outer bearing 22 is defined by a generally cylindrical inner skirt 34 such that cavity 32 extends axially about an axis of symmetry. A transition zone 36 separates cavity 32 from a spherical inner seat face 38 that is adapted to receive a spherical stud head 40 of a ball stud 42. Face 38 includes a plurality of lube grooves 44 that extend from a nose portion 46 of outer bearing 22 to transition zone 36. Preferably, there are 3 or 4 equispaced lube grooves 44.

Inner bearing 24 includes an aperture 50 to receive a stud shank 52 of ball stud 42 and is compression pre-loaded by being forced into cavity 32 of outer bearing 22. Inner bearing 22 includes a generally cylindrical outer wedge surface 54, a diameter of the wedge surface 54 being greater than a corresponding diameter of generally cylindrical inner skirt 34 of outer bearing 22. While inner skirt 34 and outer wedge surface 54 may have mating frusto-conical shapes, this is generally not preferred. If non-cylindrical surfaces are used, inner bearing 24 may become wedged within outer bearing 22 before an inner spherical seat face 56 of inner bearing 24 engages head 40, resulting in undesirable play in joint 20. This does not happen if wedge surface 54 and inner skirt 34 are both cylindrical. To aid in the insertion of inner bearing 24 into outer bearing 22, the outer and inner bearing edges are chamfered or radiused slightly.

Faces 38 and 56 share a common diameter and secure head 40 to limit its degrees of freedom to rotational motions about a common center point. Face 56 of inner bearing 24 includes a plurality of lube grooves 58 that are preferably equispaced.

A compression-rim 60 of inner bearing 22 is adapted to engage a retaining ring 62. Retaining ring 62 is generally formed from steel. Finally, joint 20 includes a grease fitting 64 that is secured to socket 30.

A cross-sectional view of the assembled ball and socket joint 20 is illustrated in FIG. 2. The joint is sealed by closing socket 30. Socket 30 is typically a forging or a casting. An annular lip 70 of socket 30 is crimped about retaining ring 62. Lip 70 is sized to ensure adequate resistance against severe loading "push out". Further, when socket 30 is closed, an axial load is applied to retaining ring 62 which is transferred to compression rim 60 of inner bearing 22 to provide additional compression pre-loading to the bearing set 21. Either one or both of the bearings may be compression pre-loaded. In the illustrated embodiment, before the axial load is applied, compression rim 62 preferably extends axially outwardly approximately 0.03 in. (0.7 mm) from an axially inner edge 74 of inner skirt 34 of outer bearing 22.

After load application, as shown in FIG. 3, compression rim 60 preferably extends axially outwardly between 0.015 in. (0.4 mm) and 0.024 in. (0.6 mm) from edge 74. Thus, in the illustrated embodiment, at least inner bearing 24 is compression pre-loaded.

While compression rim 52 must extend a short axial distance beyond edge 74 of outer bearing 22, this distance should be small so that outer bearing 22 may stabilize any pre-load upon inner bearing 24, allowing bearing set 21 to act as a "cylindrical wedge". Such a configuration provides stability for the joint under high axial and radial loading conditions while resisting rotating torque loss.

The axial compression pre-load is carried over face 56 and transferred through head 40 to corresponding face 38 of outer bearing 22. Approximately 84 percent of the head's available surface area is preferably adjacent either face 38 or face 56 to provide an optimal load distribution area. Approximately 48 percent of the available surface area for head 40 is adjacent face 38 and approximately 36 percent of the available surface area is adjacent face 56. The load is then transferred from outer bearing 22 to socket 30.

Nose portion 46 has a frusto-conical shape that permits easier molding of the outer bearing 22. More important, however, a nose portion 46 with a frusto-conical shape that conforms to and is in facial contact with a corresponding floor 76 of socket 30, provides greater load support because of an increased bearing surface area, less axial end play and radial lash, and improved joint tightness without increasing rotating torque values. If the torque values increase, operability of joint 20 decreases.

The radial compression pre-load is carried between outer wedge surface 54 of inner bearing 24 to inner skirt 34 of outer bearing 24 and from inner skirt 34 to inner surface 28 of socket 30.

Either one or both of the bearings 22 and 24 may be semi-rigid, allowing constant self-adjustment (or "take up") for wear, however small, occurring over a spherical surface 78 of head 40 as well as faces 38 and 56 of bearings 22 and 24, respectively. As wear takes place, some compression pre-loading of the bearings is released while still maintaining zero axial or radial play of the bearings 22 and 24, and head 40 within socket 30. Thus, joint 20 can handle high radial and axial load forces over an extended life.

joint 20. is applicable to a wide range of applications, including, but not limited to, rack and pinion inner and outer tie rod socket assemblies, upper and lower suspension ball joint assemblies, drag links and connecting rod assemblies, and other "ball and socket" steering knuckles. Inner and outer bearings 22 and 24 may be formed from a wide range of materials, depending on the individual application and the appropriate internal assembly force retention required during joint usage. Possible semi-rigid bearing materials include polyethylene terephthalate, sold under the trade name "ERTALYTE"; aramid aromatic polyamide polymer fiber, sold under the trade name "KEVLAR", and combined with 6,6, polyamide, sold under the trade name "NYLON", and resulting in a product sold under the trade names "HYDLAR" or "KEVLAR-NYLON"; 6,6 polyamide, sold under the trade name "NYLON", and combined with a lubricant such as molybdenum disulfide, and sold under the trade names "NYLATRON" and "MDS NYLON"; polyformaldehyde (polyacetal) polymer in oxymethylene linear structure with attached ester or ether terminal groups and sold under such trade names as "DELRIN" and "CELCON"; linear, amorphous polyester (polycarbonate), sold under such trade names as "LEXAN" and "HYZOD"; polymerized acrylonitrile-butadiene-styrene, sold under the trade name "ABS"; linear polyurethane elastomer in a high density, 75 "Shore D" hardness range, sold under the trade name "POLYURETHANE"; ultrahigh molecular weight polyethylene, sold under the trade name "UHMWPE"; chlorinated-polyvinyl-chloride, sold under the trade name "CPVC"; ethylene-hexene-1 copolymer, sold under the trade name "MARLEX"; polytetrafluoroethylene (filled), sold under the trade name "RULON"; polypropylene (polyolefin); and polyformaldehyde polymer filled with polytetrafluoroethylene fibers, sold under the trade name "DELRIN-AF".

joint 20 includes lubricant to maintain the very low wear integrity of joint 20. Grease fitting 64 seals a cup 80 within socket 30 that holds the lubricant. Lube grooves 44 in outer bearing 22 and lube grooves 58 in inner bearing 24 are used to transmit the lubricant.

An annular pocket 84 is formed between inner bearing 24 and outer bearing 22 that is generally perpendicular to lube grooves 44 and 58. As shown in greater detail in FIG. 4, pocket 84 is formed by a lip 86 in transition zone 36 of outer bearing 22, together with inner bearing 24 and head 40. Pocket 84 functions as a well for the lubricant. Equally important, however, pocket 84 provides relief through slight material "flow" for over compression of bearing material for bearings 22 and 24 during assembly.

A non-greaseable top closure ball and socket joint 100 is illustrated in FIG. 5. The configuration of joint 100 is very similar to that of joint 20, and includes a bearing set 102 with an outer bearing 104 and an inner bearing 106. There, are however no lube grooves in either of the bearings 104 and 106. Further, there is no grease fitting 64 or a cup 80. Instead, besides an annular pocket 108 formed similarly to that of pocket 84 of FIG. 4, a second shallow annular pocket 110 is formed in the spherical inner seat face 112 of outer bearing 104 to act as a well for a lubricant.

A thin coat of "lubed for life" type, high shear strength lubricant such as that sold under the trade name "CLIMAX" is applied to spherical inner seat face 112 and to inner skirt 116 of outer bearing 104. Similarly, the lubricant is applied to spherical inner seat face 118 of inner bearing 106. The amount of the lubricant should be sufficient to fill pockets 108 and 110. No provision is made for re-greasing joint 100.

In operation, a break in period is required for joint 100 to have a life extending beyond that of re-greaseable joint 20. The break in period includes simultaneous oscillation and rotation of head 40 against seat faces 112 and 118 to smooth or work the seat faces to a "slick finish" condition. In turn, head 40 is polished by seat faces 112 and 118. This action is preferable to starting with "ultra smooth finished parts" since the surfaces are customized during the break in period to result in an optimum compatible shape for the individual joint. If a correct break in period is performed, it is predicted that the operational life of joint 100 will be a minimum of 1.4 times that of joint 20, where operational life is that life before head rotating torque declines to a minimum of 2 lbs-inch or axial head movement inside bearing set 102 exceeds three times the initial axial movement under the same load.

A third embodiment of the present invention, a bottom closure "lubed for life" ball and socket joint 130 with a two-piece bearing set 132 comprising an outer bearing 134 and an inner bearing 135 is illustrated in FIGS. 6 and 7. joint 130 is similar to joint 20. An important difference is the orientation of the bearing set 132 in response to the requirements of the bottom closure joint 130. joint 130 is typically used when clearance is a problem or there is high stud pullout resistance requirement.

A housing 138 includes an aperture 140 in a floor 142 to receive a shank 144 of a ball stud 146. Before passing through aperture 140, shank 144 passes through an aperture 148 of inner bearing 136, with a spherical inner seat face 152 adapted to receive a head 150 of ball stud 146. A generally cylindrical outer wedge surface 154 of inner bearing 136 has a diameter that is greater than a corresponding diameter of a generally cylindrical inner skirt 156 of outer bearing 134, inner skirt 156 defining a cavity 158 extending axially about an axis of symmetry to receive inner bearing 136. Thus, when inner bearing 136 is inserted into outer bearing 134, a compression pre-load results. Outer bearing 134 includes a transition zone 160 that separates cavity 158 from a spherical inner seat face 162 adapted to receive head 150. An outer surface 164 of outer bearing 134 is adapted to conform to an inner surface 166 of socket 138.

Inner bearing 136 includes a compression rim 168 that extends a short distance axially outwardly from an axially inner edge 170 of inner skirt 156 of outer bearing 134, but as with joint 20, this distance should be small so that outer bearing 134 may stabilize any pre-load upon inner bearing 136, allowing the bearing set 132 to act as a "cylindrical wedge". Compression rim 168 is adapted to engage floor 142 of housing 138.

In place of a retaining ring, a sealing washer 172 is used in joint 130. Once bearing set 132 and ball stud 146 are positioned within housing 138, sealing washer 172 is inserted into the housing 138 and adapted to engage an end surface 174 of outer bearing 134.

joint 130 is sealed by closing housing 138. An annular lip 176 of socket 130 is crimped about sealing washer 172. Housing 138 includes a shoulder 173 to limit the amount of axial travel of sealing washer 172. Sealing washer 172 includes a sharp edge 178 that contacts deformed lip 176 to provide a positive seal to prevent joint lubricant from leaking out during severe operation. Further, when socket 138 is closed, an axial load is applied to sealing washer 172 which is transferred to bearing set 132 to provide additional compression pre-load. Compression rim 168 extends a shorter distance axially outwardly from axially inner edge 170 after the housing is sealed. Thus, in the illustrated embodiment, at least inner bearing 136 is compression pre-loaded.

The radial compression pre-load is carried between outer wedge surface 154 of inner bearing 135 to inner skirt 156 of outer bearing 134 and from inner skirt 156 to inner surface 166 of housing 138.

As with joint 20, either one or both of the bearings may be semi-rigid, allowing constant self-adjustment (or "take up") as the joint wears by releasing some compression pre-load of the bearing set 132 while still maintaining zero play within joint 130.

A "lubed-for life" joint 130 is illustrated, wherein an annular pocket 180 is created in the transition zone 160 of outer bearing 134. A second annular pocket 182 is formed in the spherical inner seat face 162 of outer bearing 134. As with joint 100, pockets 180 and 182 act as wells for lubricant, although pocket 180 also provides protection against over compression of bearing set 132. A re-greaseable joint is also possible. A grease fitting would be secured to an aperture within sealing washer 172 mating with a cup formed within outer bearing 134. Lube grooves would then be formed within bearing set 132 as disclosed with respect to joint 20.

A fourth embodiment of the present invention, a "lubed for life" bottom closure ball and socket joint 200, is illustrated in FIGS. 8 and 9. joint 200 comprises a two-piece bearing set 202 with an outer bearing 204 and an inner bearing 206.

A socket 208 includes an aperture 210 in a floor 212 to receive a shank 214 of a ball stud 216. Before passing through aperture 210, shank 214 passes through an aperture 218 of outer bearing 206, with a spherical inner seat face 220 adapted to receive a head 222 of ball stud 216. A cavity 224 of outer bearing 204 extending axially about an axis of symmetry is defined by a generally cylindrical inner skirt 226. A transition zone 228 separates cavity 224 from face 120.

Outer bearing 204 includes an outer surface 230 adapted to conform to an inner surface 232 of socket 208. A nose portion 234 has a preferred hemispherical shape that permits easier molding of outer bearing 204. More important, however, a nose portion 234 with a hemispherical shape that conforms to corresponding floor 212 of socket 208 provides greater load support because of an increased bearing surface area, less axial or radial play, and improved joint tightness without increasing rotating torque values. If the torque values increase, operability of joint 200 decreases. Thus, a "hemispherical wedge" is created between outer bearing 204 and socket 208. This is of particular importance when bearing set 202 is made from materials subject to creep if not sufficiently encased. joint 200 only allows oscillation and rotation of ball stud 216 about a center point without permitting any axial or radial motion.

Unlike other disclosed embodiments of the present invention, inner bearing 206 does not include an aperture to receive a shank of a ball stud. Further, inner bearing 206 has an extended axial height. As with other embodiments, however, inner bearing 206 is designed to be compression pre-loaded within cavity 224 of outer bearing 304, with a spherical seat face 234 adapted to engage head 222. Inner bearing 206 includes an outer generally cylindrical wedge surface 236, a diameter of the wedge surface 236 being greater than a corresponding diameter of inner skirt 226 of outer bearing 204. As with joint 20, Inner bearing 206 includes a compression rim 238 that extends axially outwardly a short distance from an axially inner edge 240 of inner skirt 226. This distance is minimized so that outer bearing 204 may stabilize any pre-load upon inner bearing 206, allowing bearing set 202 to act as a "cylindrical wedge".

An alternative way to seal joint 200, close socket 208, and to provide additional pre-load compression to bearing set 202 is illustrated. A radially disposed outer surface 242 of a plug 244 includes a plurality of threads 246 adapted to engage a mating radially inwardly disposed plurality of threads 248 in an upper portion 250 of socket 208. When plug 244 is threaded into socket 208, threads 246 and 248 seal joint 200, preventing the escape of lubricant under high load conditions. Plug 244 also includes a lower end face 252 to selectively engage compression rim 238 to apply an axial force that provides additional compression pre-loading to the bearing set. The axial force causes radial wedging of bearing set 202 and a distributed wedging action over the hemispherical nose 234 of outer bearing 204, resulting in a very tight assembly without excessive torque. A lower portion 254 of plug 244 includes a shoulder 256. A mating shoulder 258 is formed between portion 250 and hemispherical floor 212 of socket 208. Shoulders 256 and 258 limit the axial movement of plug 244 into socket 208 and the resulting compression pre-load to bearing set 202. A plurality of threaded apertures 260 extend radially through portion 250 of socket 208. Threaded set screws 262 are inserted into apertures 260 to stake plug 244 in place. Alternatively, plug 244 is maintained in place by staking threads 246 through apertures 260.

A "lubed-for life" joint 200 is illustrated, wherein an annular pocket 264 is created in the transition zone 228 of outer bearing 134. A second annular pocket 266 is formed in the spherical inner seat face 234 of inner bearing 206. Pockets 264 and 266 act as wells for lubricant, although pocket 264 also provides protection against over compression of bearing set 202. A re-greaseable joint is also possible. Preferably, a socket utilizing a sealing washer with an aperture to receive a grease fitting such as that illustrated with respect to joint 100, would be used.

As shown in FIG. 9, plug 244 includes a threaded cavity 266 to receive a mating threaded component 268. Thus, joint 200 may be used in many applications, and is not limited to any one application. As with each of the disclosed embodiments, bearings 204 and 206 may be formed from a wide range of materials depending on the particular application.

Preferred embodiments of the present invention have been described. It is to be understood that variations and modifications may be employed without departing from the scope of the present invention. Accordingly, the following claims should be studied to learn the true scope of the present invention.

I claim:

1. A bearing set for a ball and socket joint comprising:

an outer bearing, said outer bearing including a first spherical inner seat face and a generally cylindrical inner skirt defining a cavity, extending axially about an axis of symmetry; and an inner bearing including a second spherical inner seat face and a generally cylindrical outer wedge surface, an unloaded diameter of said outer wedge surface being greater than a corresponding unloaded diameter of said inner skirt such that a pre-load results between said inner and outer bearings when said inner bearing is forced into said cavity of said outer bearing.

2. A bearing set as recited in claim 1, wherein said first and second spherical faces share a common diameter.

3. A bearing set as recited in claim 1, wherein said inner bearing includes a compression rim that extends axially outwardly from an axially inner skirt edge of said outer bearing, such that an axial force may be applied to said compression rim to provide additional compression pre-load to the bearing set, said inner bearing being axially compressed when said axial force is applied.

4. A bearing set as recited in claim 3, wherein said compression rim extends axially outwardly between 0.015 in. (0.4 mm) and 0.025 in. (0.7 mm) from said axially inner skirt edge before said axial force is applied.

5. A bearing set as recited in claim 1, wherein at least one of said inner and outer bearings comprises a semi-rigid material.

6. A ball and socket joint comprising:

a socket;

an outer bearing disposed within said socket, said outer bearing including an outer surface adapted to conform to an inner surface of said socket, a first spherical inner seat face, and a generally cylindrical inner skirt that defines a cavity extending axially about an axis of symmetry;

a ball stud with a spherical stud head and shank; said stud head engaging said first spherical inner seat face;

an inner bearing compression pre-loaded within said cavity of said outer bearing, said inner bearing including a second spherical inner seat face engaging said stud head, and a generally cylindrical outer wedge surface, an unloaded diameter of said outer wedge surface being greater than a corresponding unloaded diameter of said inner skirt; and closure means to retain said bearings and said spherical stud head within said socket.

7. A ball and socket joint as recited in claim 6, wherein said closure means includes a sealing means placed in initial facial contact with one of said inner bearing and said outer bearing with the other of said inner bearing and said outer bearing in facial contact with a floor of said socket.

8. A ball and socket joint as recited in claim 7, wherein said inner bearing includes a compression rim that extends axially outwardly from an axially inner skirt edge of said outer bearing, such that an axial force applied by said sealing means provides additional compression loading to at least one of said inner and outer bearings, said inner bearing being axially compressed when said axial force is applied.

9. A ball and socket joint as recited in claim 8, wherein said sealing means is held in position by an annular lip of said socket.

10. A ball and socket joint as recited in claim 8, wherein said compression rim extends axially outwardly between 0,015 in. (0.4 mm) and 0,025 in. (0.7 mm) beyond said axially inner skirt edge before said axial force is applied.

11. A ball and socket joint as recited in claim 8, wherein said sealing means comprises a retaining ring.

12. A ball and socket joint as recited in claim 8, wherein said sealing means comprises a sealing washer.

13. A ball and socket joint as recited in claim 7, wherein said closure means and said sealing means comprises a threaded plug that engages mating threads of said socket.

14. A ball and socket joint as recited in claim 13, wherein said plug includes a shoulder that engages a mating shoulder within said socket to limit the travel of said plug within said socket.

15. A ball and socket joint as recited in claim 6, wherein said outer surface of said outer bearing includes a frusto-conical nose portion.

16. A ball and socket joint as recited in claim 6, wherein at least said inner bearing comprises a semi-rigid material.

17. A ball and socket joint comprising:
a socket;
an outer bearing disposed within said socket, said outer bearing including an outer surface adapted to conform to an inner surface of said socket, a first spherical inner seat face, and a generally cylindrical inner skirt that defines a cavity extending axially about an axis of symmetry;
a ball stud with a spherical stud head and shank; said stud head engaging said first spherical inner seat face;
an inner bearing compression loaded within said cavity of said outer bearing, said inner bearing including a second spherical inner seat face engaging said stud head, and a generally cylindrical outer wedge surface, an unloaded diameter of said outer wedge surface being greater than a corresponding unloaded diameter of said inner skirt, said inner bearing includes a compression rim that extends axially outwardly of an axially inner skirt edge of said outer bearing; and
closure means to retain said bearings and said spherical stud head within said socket, wherein said closure means includes a sealing means in initial facial contact with one of said inner bearing and said outer bearing with the other of said inner bearing and said outer bearing in facial contact with a floor of said socket, such than an axial force applied by said sealing means provides additional compression loading to at least one of said inner and outer bearings.

18. A ball and socket joint as recited in claim 17, wherein said closure means and said sealing means comprises a plug, said plug having threads that engage mating threads on said socket.

19. A ball and socket joint as recited in claim 18, wherein said plug includes a shoulder that engages a mating shoulder within said socket to limit the travel of said plug within said socket.

20. A method for making a ball and socket joint, comprising the steps of:
inserting a spherical stud head of a ball stud into an outer bearing;
engaging a first spherical inner seat face of said outer bearing with said stud head;
forcing an inner bearing into an axially extending cavity defined by a generally cylindrical inner skirt of said outer bearing, said inner bearing including a generally cylindrical outer wedge surface such that an unloaded diameter of said outer wedge surface is greater than a corresponding unloaded diameter of said inner skirt with a compression pre-load resulting between said outer and inner bearings;
engaging a second spherical inner seat face of said inner bearing with said stud head;
disposing said inner and outer bearings and said stud head within a socket, said outer bearing including an outer surface adapted to conform to an inner surface of said socket; and
closing said socket to secure said ball stud within said inner and outer bearings in said socket.

21. A method as recited in claim 20, further comprising the steps of:
applying an axial force to a compression rim of said inner bearing, said compression rim extending axially outwardly of an axially inner skirt edge of said outer bearing, axially compressing said inner bearing to provide additional compression pre-loading to said inner and outer bearings.

22. A method as recited in claim 20, further comprising the steps of:
inserting a sealing means into said; socket after placing said ball stud and said inner and outer bearings in said pocket; and
crimping said sealing means in position by deforming an annular lip of said socket.

23. A method as recited in claim 20, wherein said closing step comprises the step of deforming an annular lip of said socket.

24. A method as recited in claim 20, wherein said closing step comprises the steps of:
inserting a plug into said socket; and
engaging threads of said plug with mating threads of said socket.

25. A ball and socket joint comprising:
a socket;
an outer bearing disposed within said socket, said outer bearing including an outer surface adapted to conform to an inner surface of said socket, a first spherical inner seat face, and a generally cylindrical inner skirt that defines a cavity extending axially about an axis of symmetry;
a ball stud with a spherical stud head and shank; said stud head engaging said first spherical inner seat face;
an inner bearing compression pre-loaded within said cavity of said outer bearing, said inner bearing including a second spherical inner seat face engaging said stud head, and a generally cylindrical outer wedge surface, a diameter of said outer wedge surface being greater than a corresponding diameter of said inner skirt;

closure means to retain said bearings and said spherical stud head within said socket; and an annular pocket formed by a lip of said outer bearing in a transition zone between said inner skirt and said first spherical inner seat face together with said inner bearing and said spherical stud head.

26. A ball and socket joint as recited in claim 25, wherein said first and second spherical inner seat faces each include a lube groove generally perpendicular to said annular pocket.

* * * * *